United States Patent [19]
Yamamori

[11] Patent Number: 5,870,367
[45] Date of Patent: Feb. 9, 1999

[54] DISC RECORDING AND/OR REPRODUCING APPARATUS

[75] Inventor: Eiji Yamamori, Tokyo, Japan

[73] Assignee: Sony Corporation, Japan

[21] Appl. No.: 672,953

[22] Filed: Jul. 1, 1996

[30] Foreign Application Priority Data

| Jul. 3, 1995 | [JP] | Japan | 7-167380 |
| Jul. 7, 1995 | [JP] | Japan | 7-172047 |

[51] Int. Cl.⁶ .......... G11B 25/04; G11B 21/02; G11B 21/16; G11B 33/02
[52] U.S. Cl. .......... 369/75.1; 369/197; 369/219; 369/244
[58] Field of Search .......... 369/75.1, 75.2, 369/244, 249, 215, 219, 258, 194, 197, 198, 178, 191, 265

[56] References Cited

U.S. PATENT DOCUMENTS

| 4,757,401 | 7/1988 | Teranishi | 369/194 |
| 5,189,652 | 2/1993 | Inoue | 369/198 |
| 5,265,083 | 11/1993 | Ishii et al. | 369/75.1 |
| 5,473,585 | 12/1995 | Kim | 369/197 |
| 5,586,092 | 12/1996 | Seo | 369/244 |
| 5,633,853 | 5/1997 | Kim et al. | 369/197 |

FOREIGN PATENT DOCUMENTS

| 598584 | 6/1934 | Germany | 369/198 |
| 656331 | 2/1938 | Germany | 369/198 |
| 1-227290 | 9/1989 | Japan | 369/75.1 |
| 2-94092 | 4/1990 | Japan | 369/75.1 |
| 3237671 | 10/1991 | Japan . | |
| 4-119528 | 4/1992 | Japan | 369/244 |
| 5-290489 | 11/1993 | Japan | 369/198 |
| 6103733 | 4/1994 | Japan . | |
| 2137797 | 10/1984 | United Kingdom | 369/178 |

*Primary Examiner*—David L. Ometz
*Attorney, Agent, or Firm*—Ronald P. Kananen

[57] ABSTRACT

An apparatus for recording and/or reproducing a disc-shaped recording medium, such as an optical disc, includes first and second recording and/or reproducing units and a supporting member. The first and second recording and/or reproducing units record and/or reproduce the discs and are mounted in a layered fashion parallel to each other on the supporting member. One of the first and second recording and/or reproducing units is arranged on one surface of the supporting member, while the other recording and/or reproducing unit is arranged on the opposite surface of the supporting member.

14 Claims, 19 Drawing Sheets

DISC RECORDING AND/OR REPRODUCING APPARATUS

BACKGROUND

1. Field of the Invention

The present invention relates to a disc recording and/or reproducing apparatus. More particularly, the present invention relates to a disc recording and/or reproducing apparatus having plural recording and/or reproducing units.

2. Background of the Invention

In recent years there has been an increase in popularity of disc recording and/or reproducing apparatuses for recording and/or reproducing information signals on or from a disc-shaped recording medium, such as an optical disc or a magneto-optical disc. Such a disc recording and/or reproducing apparatus includes a disc driving unit rotated along with a disc and which is adapted for writing/reading information signals on or from the rotated disc.

The disc driving unit includes a disc table adapted for holding the disc and which is rotated along with this disc by a motor operating as a driving source. The disc driving unit also includes an optical pickup unit and a magnetic head unit for recording or reading out information signals on or from the disc rotated along with the disc table.

With the disc recording and/or reproducing apparatus, the disc is positioned on the disc table with a chucking center aperture as a reference, and is held in this condition by a holder for rotation. By the head unit, the information signals are recorded on or read out from the recording disc.

There also exists a multiple disc changer, in which a plurality of discs are housed and held within a disc stocker in an outer casing, and a selected one of the discs is taken out of the disc stocker and loaded on the disc driving unit for recording and/or reproduction.

Such a disc changer has one or more disc driving units and a transporting mechanism for transporting discs between the disc stocker and the disc driving unit or between the disc driving units.

The transporting mechanism selectively takes out and transports a disc from the disc stocker and loads the selected disc on the disc driving unit. The transporting mechanism also dismounts the disc loaded on the disc driving unit and returns the disc to an original housing position in the disc stocker.

With the above-described disc changer, if there is provided only one disc driving unit, the disc transporting distance by the transporting mechanism is increased, thus complicating the structure of the apparatus. Since the recording and/or reproducing operation is carried out by a single disc driving unit, it becomes difficult to exchange the discs promptly, so that it becomes difficult to perform recording and/or reproduction of multiple recording discs without interruptions.

SUMMARY OF THE INVENTION

It is therefore an object of the present invention to provide a disc recording and/or reproducing apparatus which resolves the above-mentioned problem.

According to the present invention, there is provided a disc recording and/or reproducing apparatus including first and second recording and/or reproducing units and a supporting member. The first disc recording and/or reproducing unit records and/or reproduces a disc, while the second disc recording and/or reproducing unit also records and/or reproduces a disc. The supporting member supports the first and second recording and/or reproducing units in a layered fashion. The first recording and/or reproducing unit is provided on one surface of the supporting member, while the second recording and/or reproducing unit is provided on the other surface of the supporting member.

According to the present invention, there is also provided a disc recording and/or reproducing apparatus including first and second recording and/or reproducing units and a supporting member. The first disc recording and/or reproducing unit records and/or reproduces a disc, while the second disc recording and/or reproducing unit also records and/or reproduces a disc. The supporting unit supports the first and second recording and/or reproducing units. The supporting unit supports the first and second recording and/or reproducing units so that, in the disc recording and/or reproducing states of the first and second recording and/or reproducing units, the discs run parallel to each other. The second recording and/or reproducing units are arranged in a layered fashion with respect to the first recording and/or reproducing unit with the supporting unit in between.

DESCRIPTION OF THE INVENTION

Figure 1:
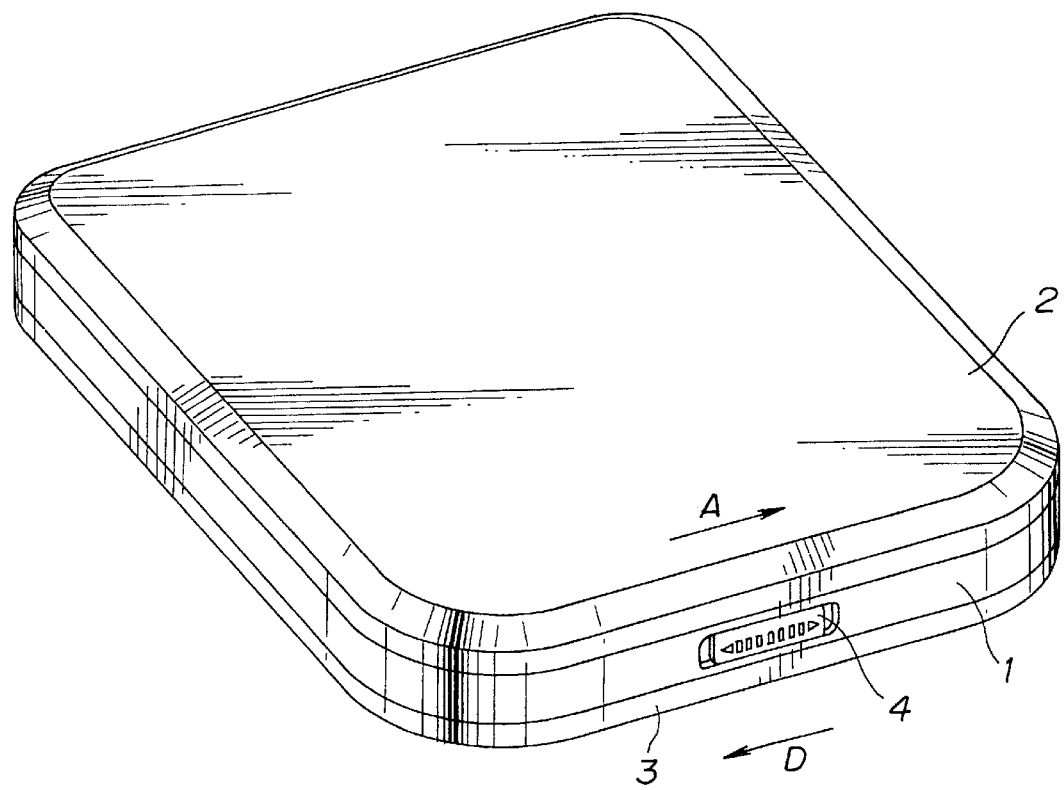
FIG. 1 is a perspective view showing an overall disc player according to a first embodiment of the present invention.

Referring to the drawings, preferred embodiments of the disc recording and/or reproducing apparatus according to the present invention will be explained in detail. The following description is made with reference to an optical disc as a disc-shaped recording medium and to a disc player for reproducing the optical disc as the disc recording and/or reproducing apparatus.

Figure 2:
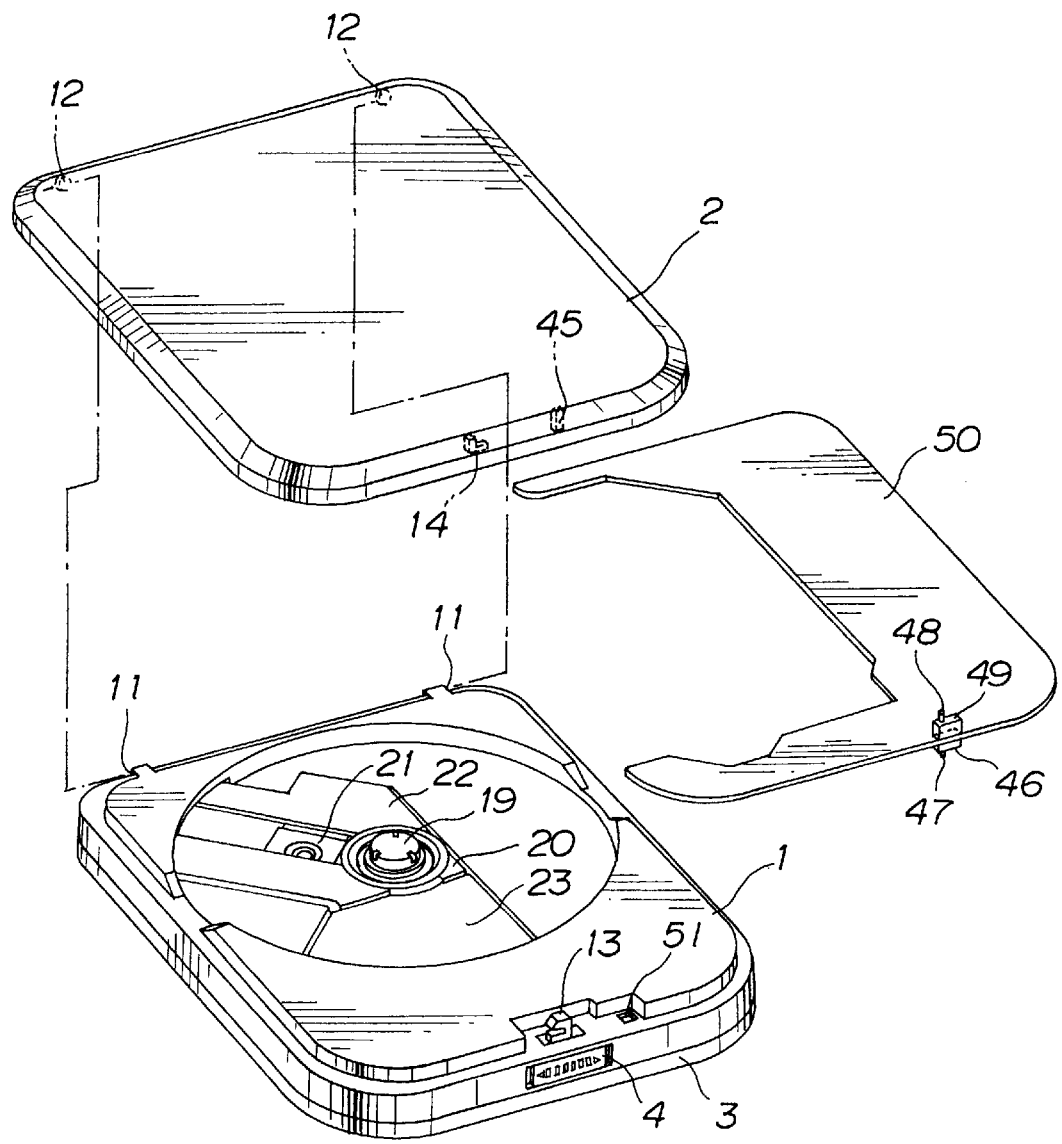
FIG. 2 is an exploded perspective view showing the structure of the disc player shown in FIG. 1.
Figure 3:
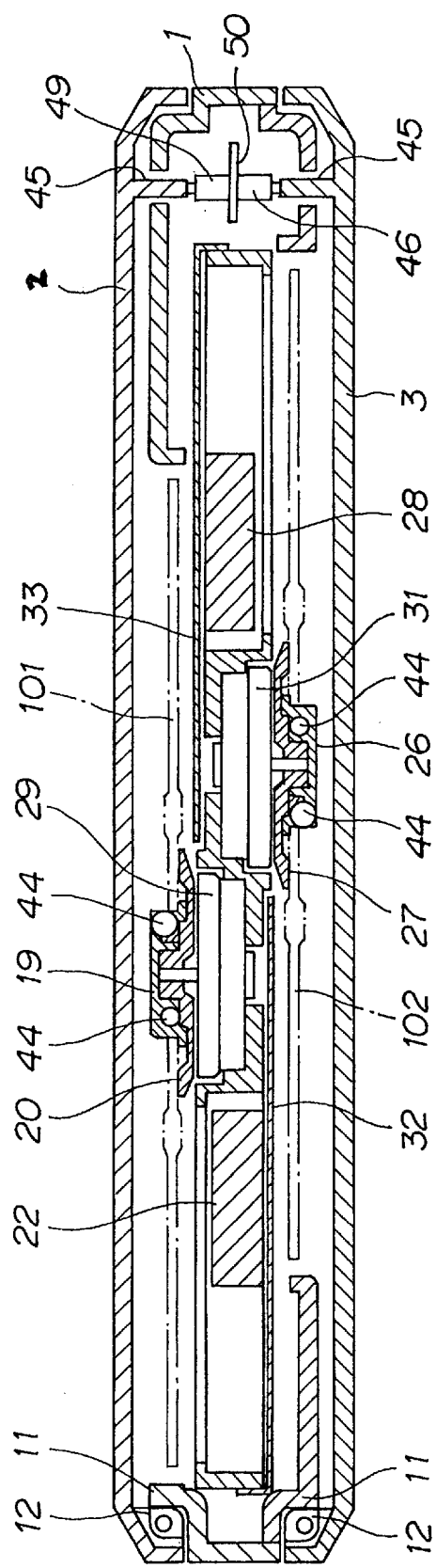
FIG. 3 is a longitudinal cross-sectional view showing the structure of the disc player shown in FIG. 1.

The disc player according to the present first embodiment has a main body portion 1, as shown in FIGS. 1 through 3. The main body portion 1 is formed as a flat plate substantially corresponding in size to optical discs 101, 102 to be reproduced by the disc player.

The optical discs 101, 102 are disc-shaped recording media having pre-set diameters, such as 120 mm, 80 mm or 64 mm, and may be a so-called optical disc or a magneto-optical disc. Each of the optical discs 101, 102 has a circular center chucking aperture. The optical discs 101, 102 may also be used while it is packaged within a disc cartridge in the form of a thin rectangular casing instead of being used in the unpackaged form.

A disc drive 22 for loading the disc 101 therein is arranged on the upper surface of the main body portion 1 of the disc player. On the lower surface of the main body portion 1 is arranged a second disc driving unit 28 for loading the second optical disc 102.

Figure 7:
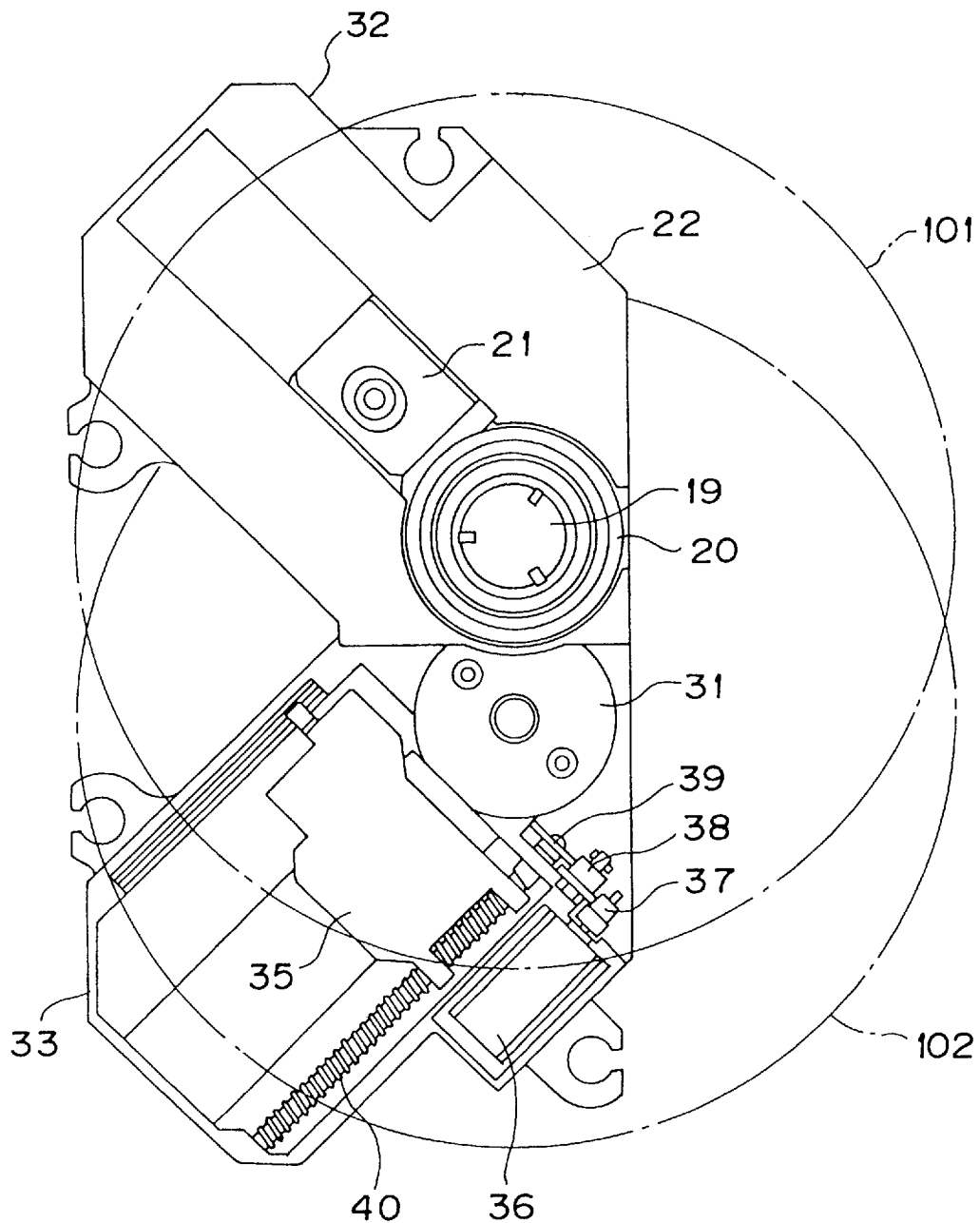
FIG. 7 is a plan view showing the structure of first and second disc driving units of the disc player shown in FIG. 1.
Figure 8:
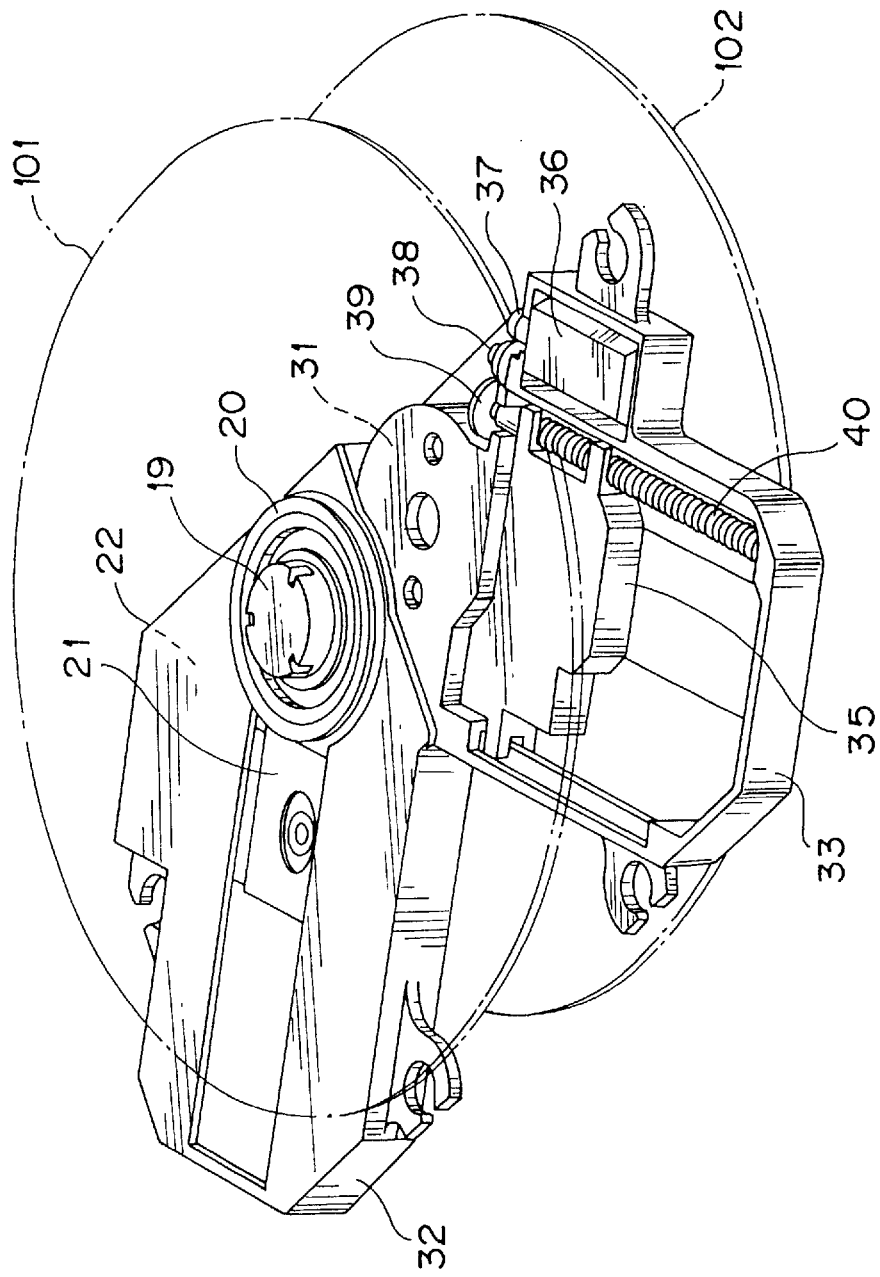
FIG. 8 is a perspective view showing the structure of first and second disc driving units of the disc player shown in FIG. 1.
Figure 9:
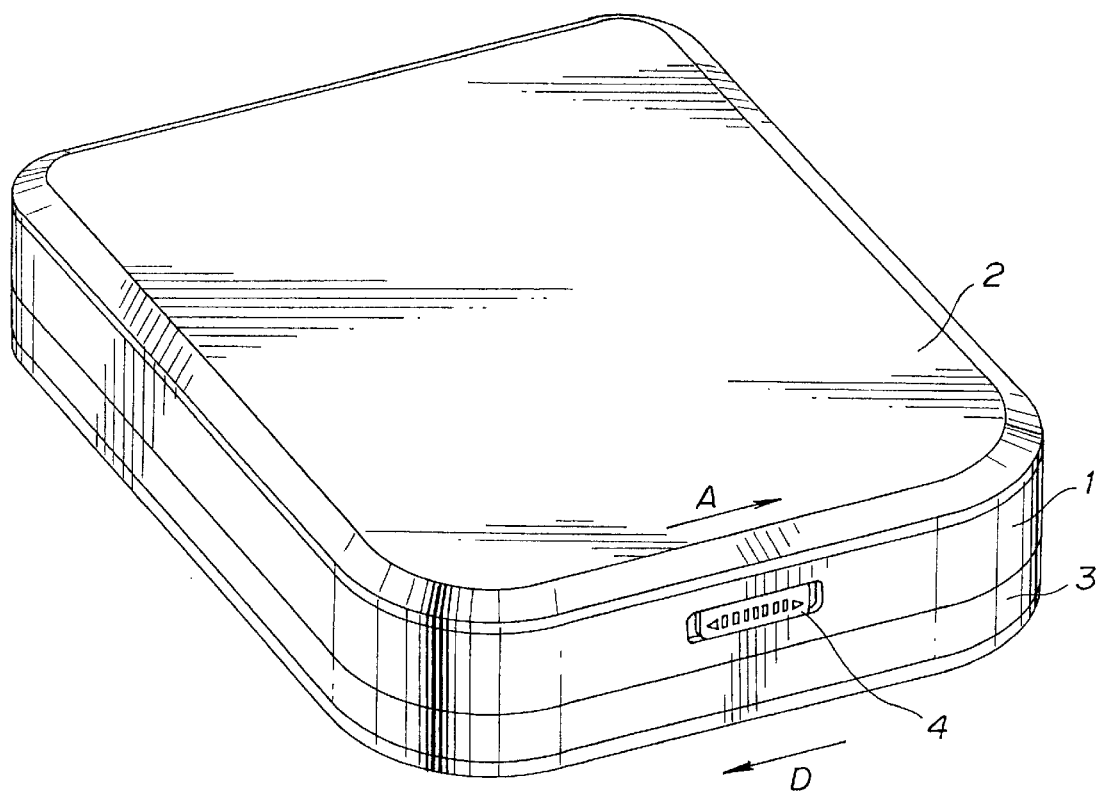
FIG. 9 is a perspective view showing an overall disc player according to a second embodiment of the present invention.

These disc driving units 22, 28 are provided with disc tables 20, 27, respectively, adapted for being rotated by spindle motors 29, 31, and with optical pickup units 21, 35, respectively, adapted for being moved into and out of contact with the disc tables 20, 27, respectively, as shown in FIGS. 7 and 8.

The disc driving units 22, 28 are provided with first and second frames 32, 33, respectively. These frames 32, 33 are fitted with spindle motors 29, 31 and optical pickup units 21, 35, respectively.

Each of the disc tables 20, 27 is formed in a substantially disc form having a diameter corresponding to the shape of a non-recording area towards the center of the disc. At the center of the upper surfaces of the disc tables 20, 27 are formed chuck protrusions 19, 26, substantially in the frusto-conical shape, engaged in chucking apertures of the optical discs 101, 102, respectively, for positioning the discs 101, 102 with respect to the disc tables 20, 27, respectively.

Plural ball members 44 are enclosed in the inside of the chuck protrusions 19, 26 to partially protrude from the outer peripheral surfaces thereof. These ball members 44 are elastically biased towards the outer periphery to radially protrude from the center of the disc tables 20, 27.

When the chuck protrusions 19, 26 are engaged in the chucking apertures of the optical discs 101, 102, these ball members 44 thrust the inner peripheral portions of the chucking apertures radially outwardly to hold the optical discs 101, 102 with respect to the disc tables 20, 27, respectively.

The disc tables are provided with openings engaged by spindle shafts of the spindle motors 29, 31 along the center axes, respectively. The disc tables are mounted on the distal ends of the driving shafts, that is spindle shafts, of the spindle motors 29, 31, by having the spindle shafts engaged in these openings. The disc tables 20, 27, with the optical discs 101, 102 held thereby in position, are rotated by the spindle motors 29, 31, along with the optical discs 101, 102, respectively.

Each of the optical pickup units 21, 35 has an optical block, within which are enclosed a semiconductor laser, as a light source, an objective lens for converging the light beam radiated by the semiconductor laser to a recording layer of each of the optical discs 101, 102, an optical element for guiding the light beam radiated by the semiconductor laser to the objective lens and a photodetector for detecting the light beam incident via the objective lens after reflection by the recording layer.

Each of the optical pickup units 21, 35 is arranged so that the objective lens faces each of the optical discs 101, 102 held and rotated by the disc tables 20, 27, the light beam radiated by the light source is condensed on the recording layer of each of the optical discs 101, 102 for recording or reading the information signals on or from the recording layer.

The optical pickup units 21, 35 are supported by frames 32, 33, respectively, for radial movement with respect to the disc, that is in a direction towards and away from the disc tables 20, 27, respectively. These optical pickup units 21, 35 are moved radially with respect to the disc, by a transmission mechanism, as later explained, under the driving force of pickup feed motors 36 mounted on each of the frames 32, 33, respectively.

The structure of the mechanism for transmitting the driving power from the feed motor 36 to the optical pickup unit is as follows: A driving shaft 37 is mounted on a driving shaft of the pickup feed motor 36. The driving shaft 37 meshes with a transmission gear 38 rotatably supported by the frame 32 or 33. The transmission gear 38 meshes with a follower gear 39 rotatably supported by the frame 32 or 33. On the follower gear 39 is coaxially and integrally mounted a screw shaft 40.

The outer periphery of the screw shaft 40 has screw flutes engaged by the optical block of the optical pickup unit 21 or 35. The driving power from the motor 36 is transmitted to the screw shaft 40 via gears 37, 38 for rotating the screw shaft. This causes the optical pickup unit 21 or 35 to be fed axially with respect to the screw shaft 40.

The optical pickup unit 21 of the first disc driving unit 22 is moved across the inner and outer rims of the first optical disc 101 held and rotated by the disc table 20 for reading out the information signals from the entire surface of the signal recording area of the first optical disc 101.

The optical pickup unit 35 of the second disc driving unit 28 is moved across the inner and outer rims of the second optical disc 102 held and rotated by the disc table 27 for reading out the information signals from the entire surface of the signal recording area of the second optical disc 102.

Figure 4:
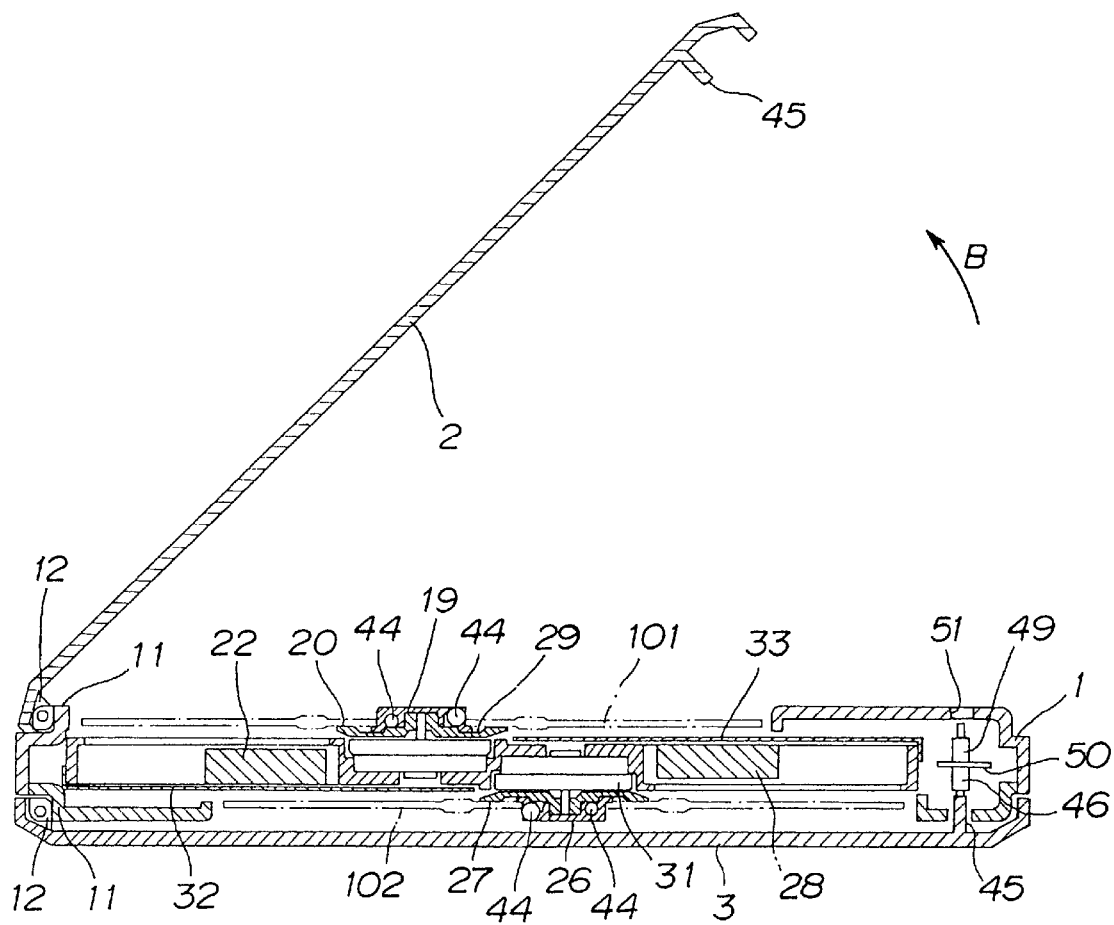
FIG. 4 is a longitudinal cross-sectional view showing the structure of the disc player shown in FIG. 1, with an upper lid being opened.
Figure 5:
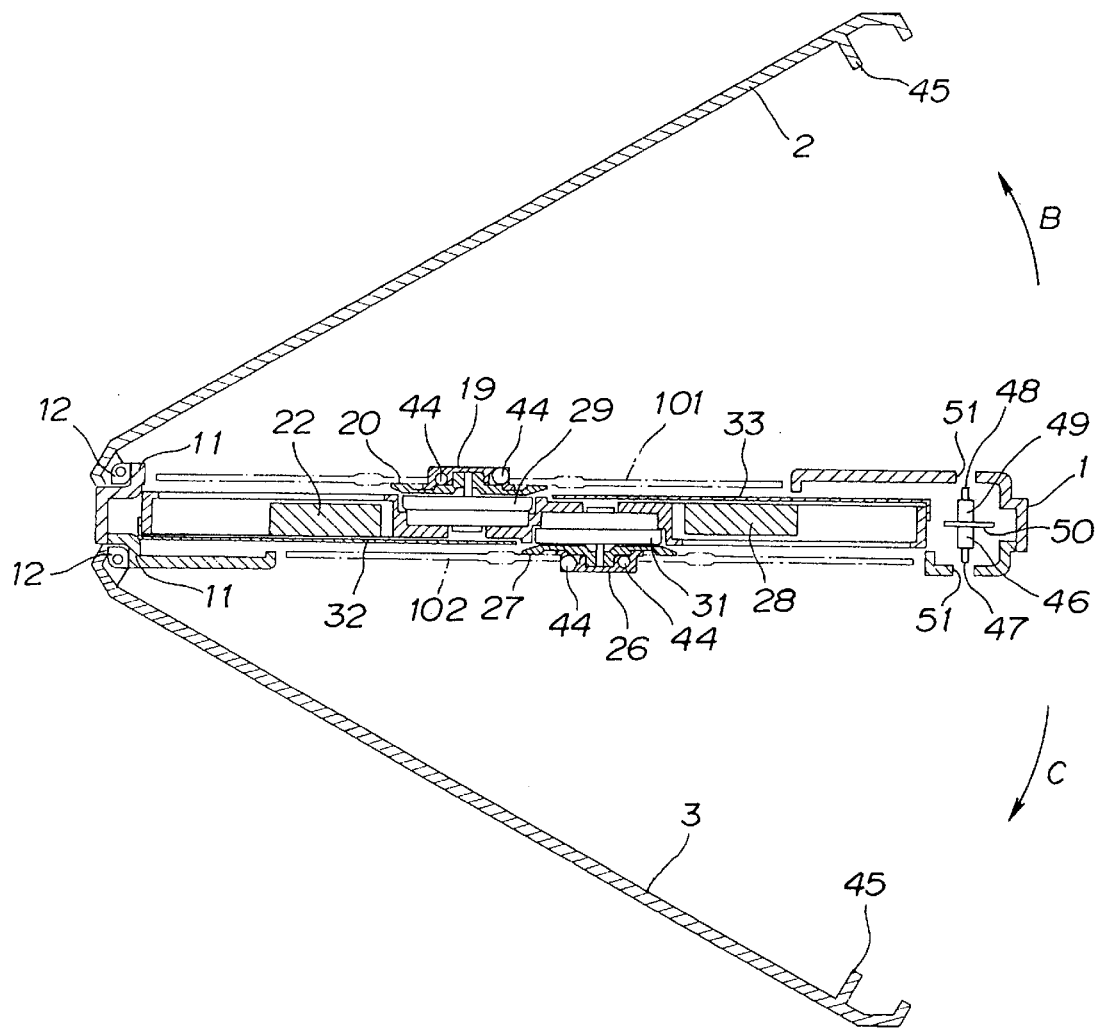
FIG. 5 is a longitudinal cross-sectional view showing the structure of the disc player shown in FIG. 1, with an upper lid and a lower lid being opened.

The first disc driving unit is arranged on the frame 33, while the second disc driving unit is arranged on the frame 32, as shown in FIG. 4. Stated differently, the first disc driving unit 22 and the second disc driving unit 28 are arranged on the outer sides of the two parallel surfaces delimited by the frames 32, 33. In the arrangement shown in FIG. 4, the first disc driving unit 22 and the second disc driving units 28 are arranged on the upper and lower sides of the main body portion 1, respectively. The first disc driving unit 22 and the second disc driving unit 28 are arranged in the main body portion 1 so that the sides of the optical discs 101, 102 scanned by the optical pickup units 21, 35 face each other via frames 32, 33 and so that the discs 101, 102 run substantially parallel to each other. The spindle motors 29, 31 of the first and second disc driving units 22, 28 are arranged so that the center of rotation of one of the spindle motors is offset with respect to that of the other spindle motor for reducing the thickness of the disc player in its entirety, as shown in FIGS. 3 through 5. As a principle, there is no limit as to the amount or direction of offset as long as there is no overlap between the two centers of rotation in the cross-section of the disc player.

Figure 6:
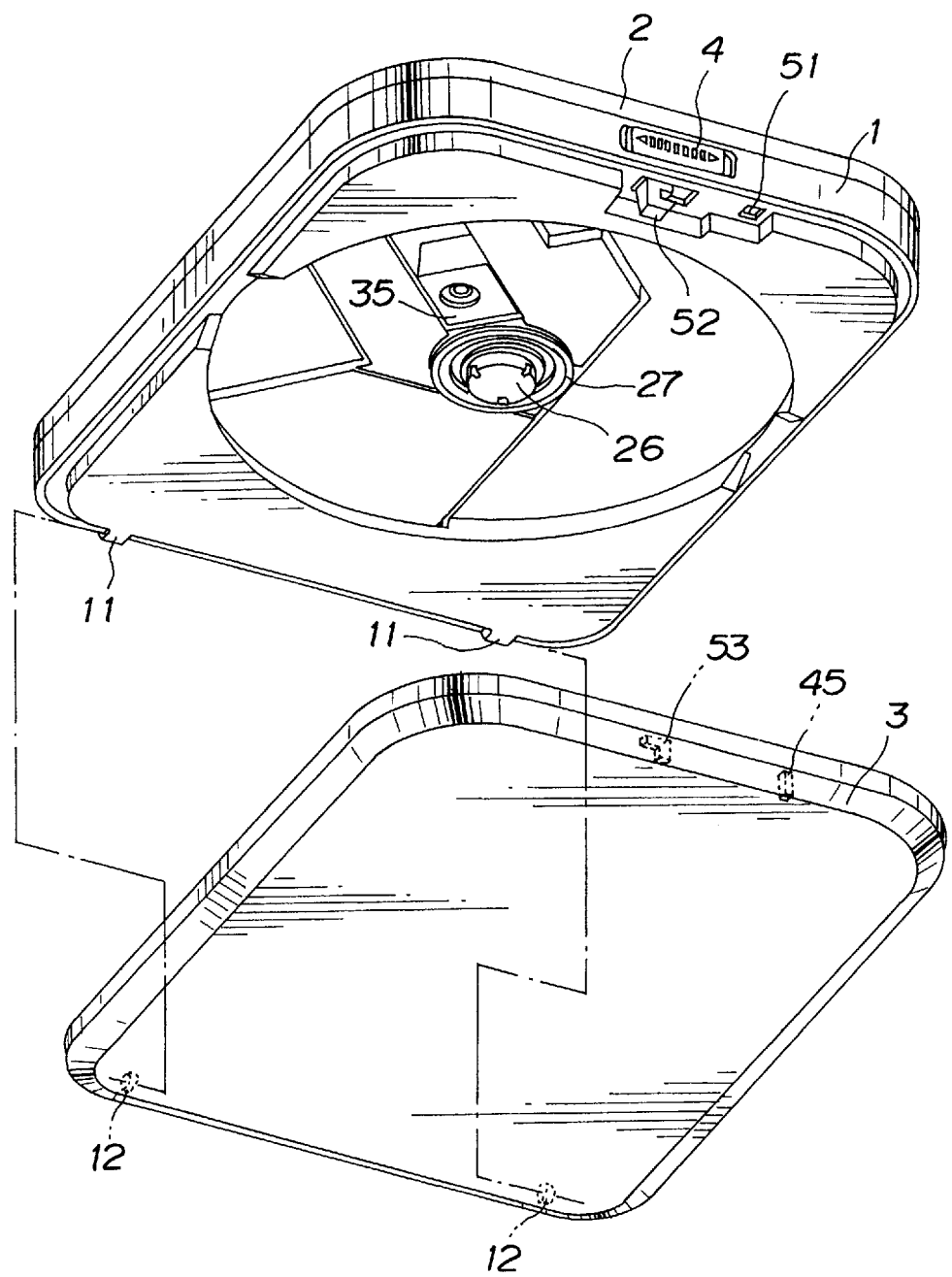
FIG. 6 is a perspective view showing the disc player shown in FIG. 1, looking from the bottom side and shown with the lower lid removed.

The main body portion 1 is provided with an upper lid 2 and a lower lid 3 which are rotatably mounted for opening and closing the upper and lower surfaces of the main body portion 1, that is the upper sides of the first and second disc driving units 22, 28, as shown in FIGS. 4 through 6. These upper and lower lids 2, 3 may be selectively opened by actuating a lid-opening knob 4 provided on the front side of the main body portion 1. If the knob 4 is rotated in the direction of arrow A, the upper lid 2 is opened, as shown in FIG. 1. If the knob 4 is rotated in the direction of arrow D, the lower lid 3 is opened, as shown in FIG. 1. The mechanism of the knob 4 will be explained subsequently.

The upper lid 2 and the lower lid 3 are connected at rear ends thereof by hinges 11, 11 associated with the main body portion and by hinges 12, 12 associated with the lids to rotate the lids relative to the main body portion 1, as shown in FIG. 5.

The hinges 11, 11 associated with the main body portion 1 are formed at left and right sides on the rear ends of the upper and lower surfaces of the main body portion 1. The hinges 12, 12 associated with the upper lid 2 are provided at the left and right sides on the rear end of the upper lid 2, as shown in FIGS. 2 and 4. The lid side hinges 12, 12 associated with the upper lid 2 are engaged with the upper side hinges 11, 11 associated with the main body portion 1 for rotatably mounting the upper lid 2. The hinges 12, 12 associated with the lower lid 3 are provided at the left and right sides on the rear end of the lower lid 3, as shown in FIGS. 5 and 6. The lid side hinges 12, 12 associated with the lower lid 3 are engaged with the lower side hinges 11, 11 associated with the main body portion 1 for rotatably mounting the lower lid 3.

With the present disc player, the upper lid 2 may be rotated with respect to the main body portion 1, as indicated by arrow B in FIGS. 4 and 5, for exposing the first disc driving unit 22 arranged on the upper side of the main body portion 1 to outside of the disc player.

After the upper lid 2 has been rotated as shown in FIGS. 4 or 5 for exposing the disc driving unit 22 to outside, the disc 101 may be loaded on or unloaded from the disc table 20.

With the disc player, the lower lid 3 may be rotated with respect to the main body portion 1, as indicated by arrow C in FIG. 5, for exposing the second disc driving unit 28 arranged on the lower side of the main body portion 1.

After the lower lid 3 has been rotated to expose the first disc driving unit 22, the disc 102 may be loaded on or unloaded from the disc table 27, as in the case of the first disc driving unit 22 described above.

On the front side of the main body portion 1 is a slidable lid-opening knob 4, as shown in FIG. 1. The lid-opening knob 4 has an upper engagement pawl 13 and a lower engagement pawl 52, as shown in FIGS. 14 through 18. The engagement pawls 13, 52 are hooked in profile and protrude upwards and downwards, respectively, from the front edge of the main body portion 1. The bending direction of the hook shape of the engagement pawl 13 and that of the engagement pawl 52 are reversed relative to each other and extend along the sliding direction of the lid-opening knob 4.

The lid-opening knob 4 has a pair of elongated support holes 63, 64. The lid-opening knob 4 is supported for sliding relative to the main body portion 1 by inserting a pair of support pins 61, 62 provided on the main body portion 1 in these elongated support holes 63, 64, respectively.

The lid-opening knob 4 is elastically biased by a torsion coil spring 58 supported by a supporting rod 57 provided on the main body portion 1 to return the knob 4 to an initial point corresponding to a mid point of the slide range. A first control protrusion 59 provided on the main body portion 1 is clamped between two arm portions of the torsion coil spring 58. A second control protrusion 60 formed on the lid-opening knob 4 is similarly clamped between the two arm portions of the torsion coil spring 58.

Figure 17:
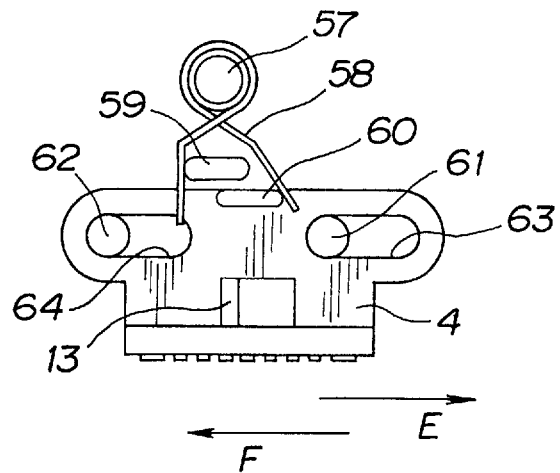
FIG. 17 is a plan view showing the lid having been opened by the lock mechanism.

Therefore, if the lid-opening knob 4 is slid in either direction away from the mid position of the slide range as indicated by arrow E in FIG. 17, the distance between the first and second control protrusions 58, 60 is enlarged, as a result of which the distance between the first and second control protrusions 58, 60 is diminished by the arm portions of the torsion coil spring 5. Hence the lid-opening knob 4 is elastically biased for being restored to the mid position, as indicated by arrow F in FIG. 17.

On the lower surface of the front position of the upper lid 2 is a mating engagement portion 14 engaged by an upper engagement pawl 13. On the upper surface of the front position of the lower lid 3 is a mating engagement portion 53 engaged by a lower engagement pawl 52.

When the upper lid 2 is closed relative to the main body portion 1, the upper engagement pawl 13 of the lid-opening knob 4 engages with the mating engagement portion 14 to hold the upper lid at the lid closing position to close the upper side of the first disc driving unit 22. When the lower lid 3 is closed relative to the main body portion 1, the lower engagement pawl 52 of the lid-opening knob 4 engages with the mating engagement portion 53 to hold the lower lid at the lid closing position to close the upper side of the second disc driving unit 28, or the lower side thereof in FIG. 5.

Figure 15:
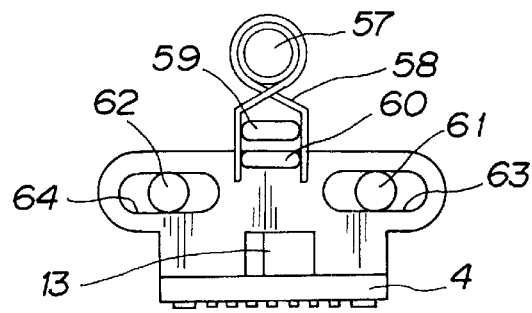
FIG. 15 is a plan view showing the structure of the lock mechanism.
Figure 16:
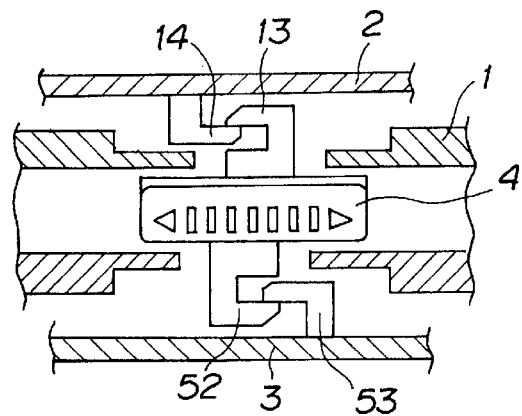
FIG. 16 is a plan view showing the lock mechanism, partially broken away.

In the mid position of the slide range, the lid-opening knob 4 has the engagement pawls 13, 52 engaged with the mating engagement portions 14, 53 of the lids 2, 3, as shown in FIGS. 15 and 16.

Figure 18:
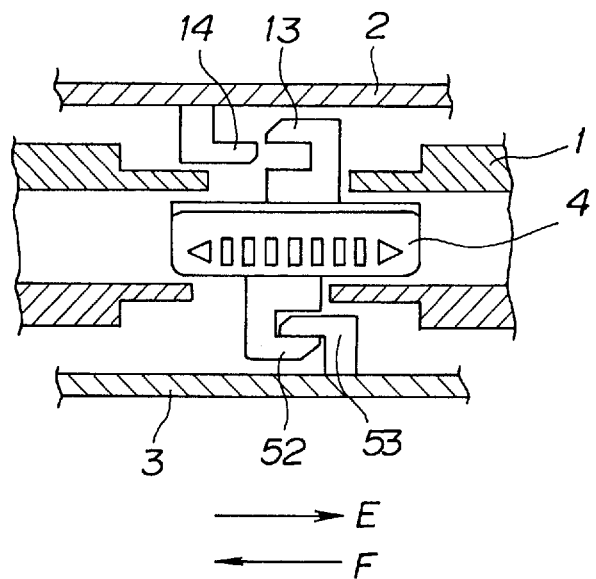
FIG. 18 is a front view showing the lid having been opened by the lock mechanism, with a portion being broken away.

If the lid-opening knob 4 is slid in one direction, that is in a direction E in FIG. 18, the upper engagement pawl 13 is disengaged from the mating engagement portion 14 of the upper lid 2, as shown in FIG. 18. At this time, the lower engagement pawl 52 is kept engaged with the mating engagement portion 53 of the lower lid 3.

When the lid-opening knob 4 is slid in one direction for disengaging the upper engagement pawl 13 from the mating engagement portion 14, the upper lid 2 is released from the lid closing state and may be opened relative to the main body portion 1.

If the lid-opening knob 4 is slid towards the opposite side to the side described above, that is in a direction of arrow F in FIG. 18, the lower engagement pawl 52 is disengaged from the mating engagement portion 53 of the lower lid 3. At this time, the upper engagement pawl 13 is kept engaged with the mating engagement portion 14 of the upper lid 2.

When the lid-opening knob 4 is slid in the opposite direction for disengaging the lower engagement pawl 52 from the mating engagement portion 53, the lower lid 3 is released from the lid closing state and may be opened relative to the main body portion 1.

That is, with the present disc player, the upper lid 2 or the lower lid 3 may be selectively opened depending on the direction that the lid-opening knob 4 is slid.

With the above-described disc player, by loading the optical discs 101, 102 on the disc tables 20, 27 of the disc driving units 20, 27, respectively, and closing the lids 2, 3, the information signals may be continuously reproduced from the optical discs 101, 102 by the optical pickup units 21, 35 of the disc driving units 22, 28, respectively. For example, if the last address of data or information signals recorded on the optical disc 101 loaded on the first disc driving unit 22 is reached, the second disc driving unit 28 is automatically started by a controller (not shown) for automatically starting reproduction of the optical disc 101 loaded on the second disc driving unit 28. Of course, a variety of methods may be used for coordinating operations between the first disc driving unit 22 and the second disc driving unit 28 or vice versa instead of a method of monitoring the addresses recorded on the optical discs 101, 102 by the controller.

With the present disc player, while the disc recording and/or reproducing operation is being performed on or from the disc loaded on one of the disc driving units 22, 28, the lid 2 or 3 may be opened for the other disc driving unit for loading or unloading the disc.

The present disc player is provided with an upper lid opening detection switch 49 and a lower lid opening detection switch 46 in association with the lids 2, 3, respectively. These lid opening detection switches 49, 46 are mounted on the upper and lower surfaces of a printed board 50 arranged on the front side of the main body portion 1. These lid opening detection switches 49, 46 are mounted with pressers 48, 47 facing through-holes 51, 51 formed in the upper and lower surfaces of the main body portion 1.

The lids 2, 3 are provided with pressuring rods 45, 45 inserted into the inside of the main body portion 1 via through-holes 51, 51 for contacting the associated pressers 48, 47 of the lid opening detection switches 49, 46, respectively. The pressers 48, 47 of the lid opening detection switches 49, 46 are thrust only when the lids 2, 3 are closed with respect to the main body portion 1. When the contact on the pressers 48, 47 is released, the lid opening detection switches 49, 46 output lid-opening detection outputs.

The lid-opening detection outputs of the lid opening detection switches 49, 46 are sent to the aforementioned controller (not shown) enclosed within the main body portion 1. The controller terminates the operation of the disc driving units 22, 28, associated with the opened lids 2, 3, herein the reproducing operation, based on the lid-opening detection outputs. The disc driving units 22, 28 are prohibited from performing the reproducing operation while its associated lid 2 or 3 is kept open.

The disc player of the first embodiment is provided with an operating unit, including plural operating switches (not shown) within its main body portion 1. These switches may be enumerated by a switch for turning a power source of the disc layer on and off, a switch for selecting on which of the first and second disc driving units the optical disc is to be reproduced, and a switch for accessing plural information items or data recorded on the optical disc. An output signal of the operating unit, the switches of which have been set by the user of the disc player, is sent to the aforementioned controller (not shown). The controller controls the reproducing operation for the first or the second disc driving unit based on the signal supplied from the operating unit.

The present disc player may be provided on one of the lids 2 arid 3, for example, on the lower lid 3, with a third disc driving unit 18 for loading a third optical disc 103 thereon, so that the driving unit 18 will face the main body portion 1, as shown in FIGS. 9 through 13. Such a disc player according to a second embodiment of the present invention is now explained in detail with reference to FIGS. 9 through 13. Elements which are common with the first embodiment are denoted by the same reference numerals and the detailed description of these elements is omitted for clarity.

Similar to the first two disc driving units 22, 28, the third disc driving unit 18 includes a spindle motor 30 mounted on a frame 34, a disc table 16 mounted on a driving shaft of the spindle motor 30 and having a positioning chuck protrusion 15, and an optical pickup unit 17 mounted for movement relative to the frame 34.

The third disc driving unit 18 is arranged on the upper surface of the lower lid 3 so that the disc table 16 is positioned on the side of the main body portion 1.

Figure 12:
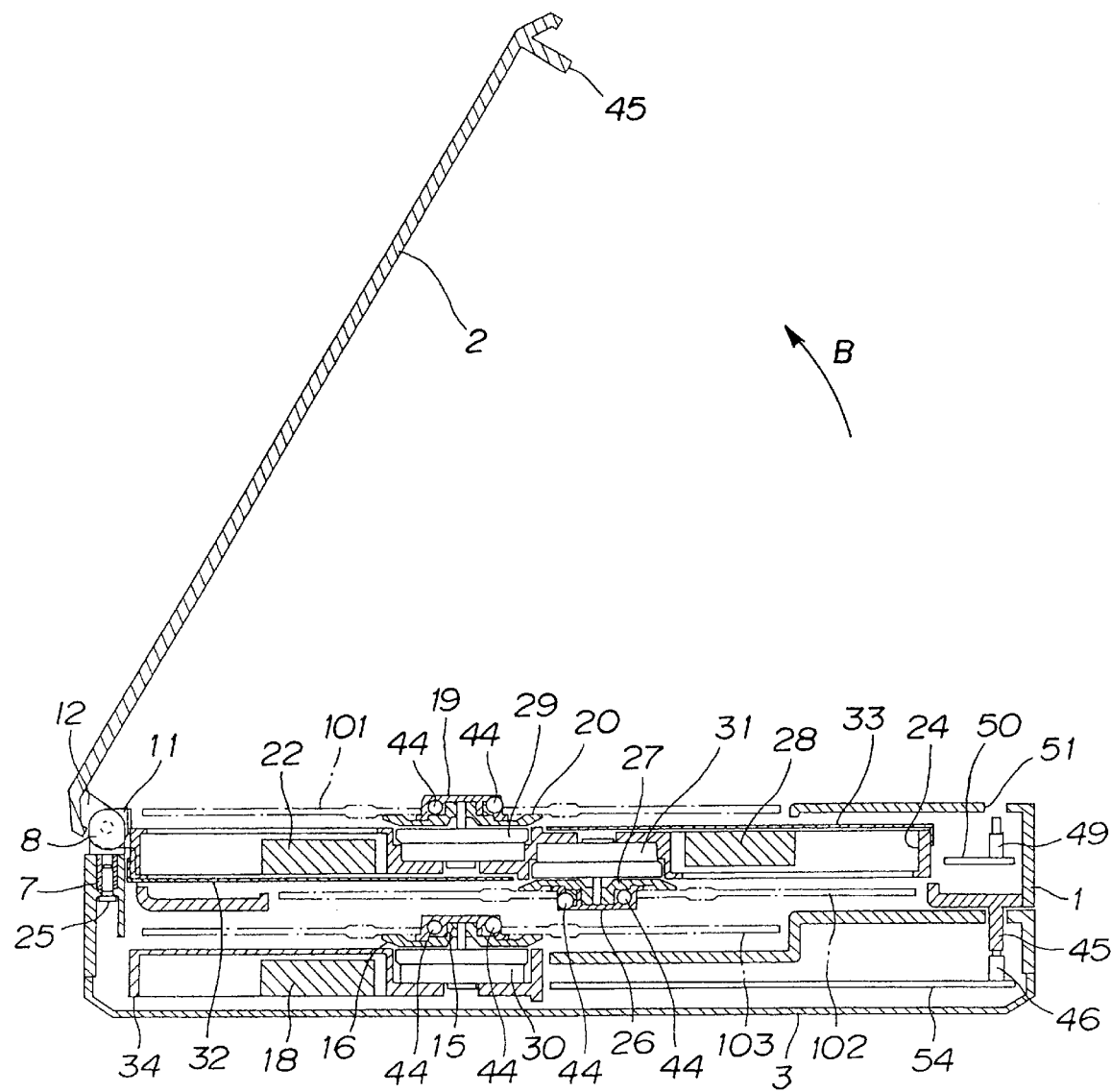
FIG. 12 is a longitudinal cross-sectional view showing the structure of the disc player shown in FIG. 9, with an upper lid being opened.

Stated differently, the third disc driving unit 18 is arranged on the lower lid 3 so that the disc table 16 of the third disc driving unit 18 will face the disc table 26 of the second disc driving unit 28. The third disc driving unit 18 is arranged so that the scanning surface by the optical pickup unit 17 of the optical disc 103 loaded on the third driving unit 18 is oriented in the same direction as the scanning surface by the optical pickup unit 21 of the optical disc 103 loaded on the first driving unit 22. This means that, with the present second embodiment, the third optical disc driving unit is arranged at a position corresponding to the parallel displacement of the first disc driving unit towards the lower side in FIG. 12. The distance between the second disc driving unit 28 and the third disc driving unit 18 is such a distance in which the optical discs 102, 103 loaded on the disc driving units 28, 18, respectively, are not abutted against each other, while the optical discs 102, 103 are also not abutted against each other when the disc are run in rotation. A spindle motor 30 of the third disc driving unit 18 is arranged at a position offset from the center of rotation of the spindle motor 31 of the second disc driving unit 28, that is at a position aligned with the rotational centerline of the spindle motor 29 of the first disc driving unit 32, as shown in FIG. 12. The result is that the disc player can be reduced in thickness, as in the first embodiment.

Figure 10:
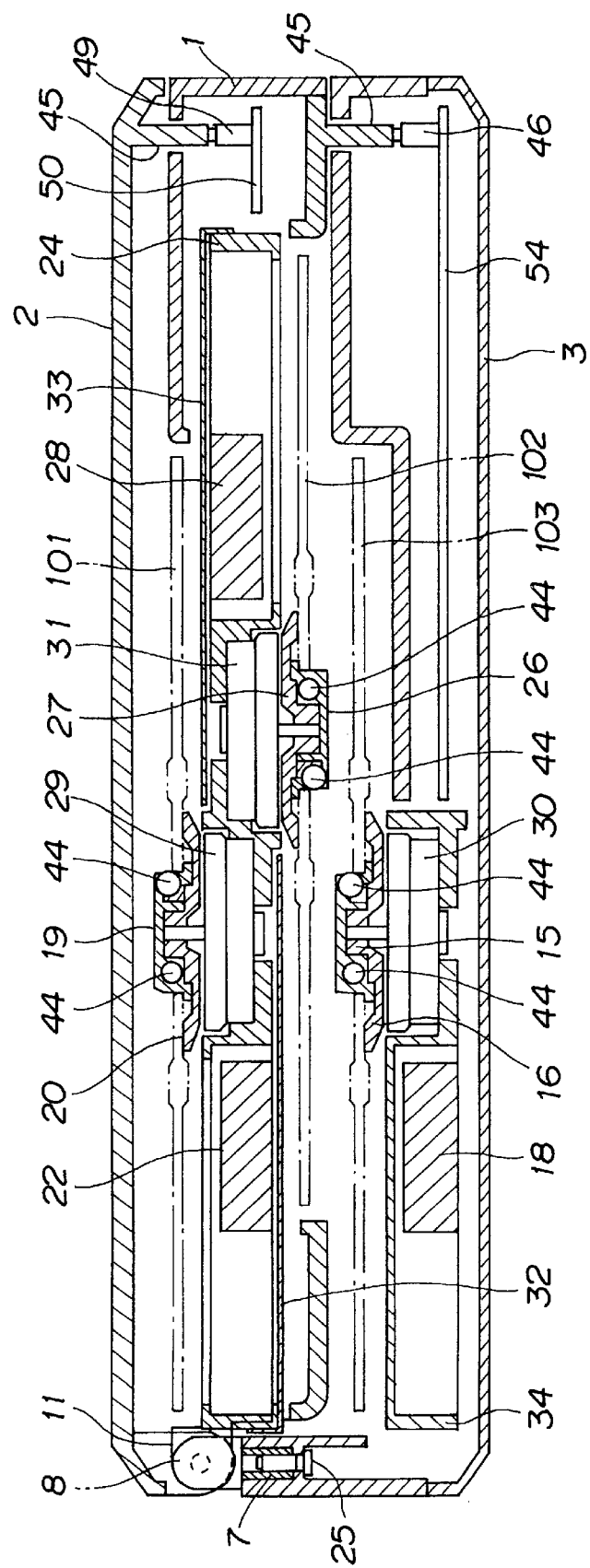
FIG. 10 is a longitudinal cross-sectional view showing the structure of the disc player shown in FIG. 9.
Figure 11:
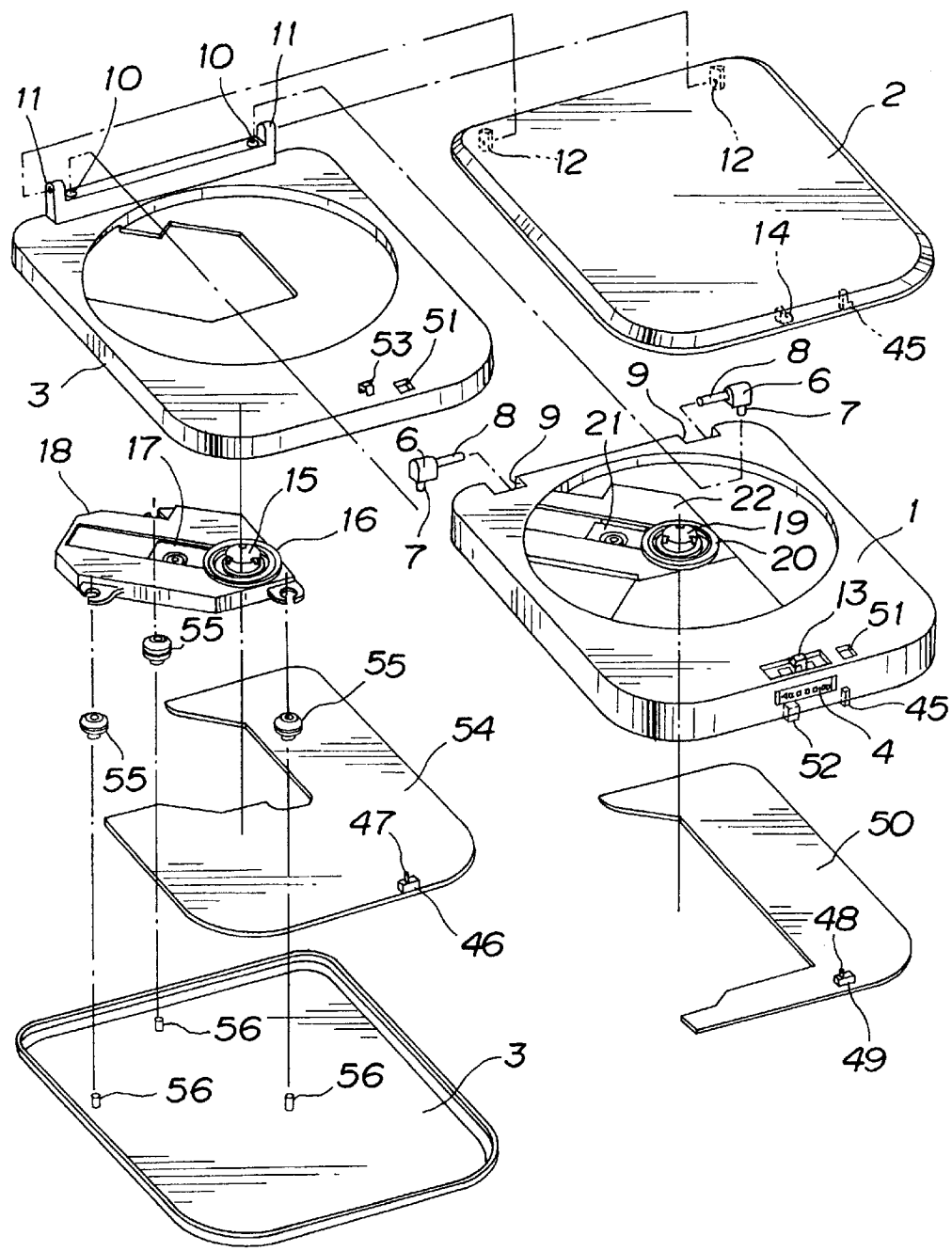
FIG. 11 is an exploded perspective view showing the structure of the disc player shown in FIG. 9.

With the disc player of the second embodiment, left-side and right-side rotation supporting members 6, 6 are mounted on the rear portion of the lower lid 3, as shown in FIGS. 10 and 11. These rotation supporting members 6, 6 are provided with supporting rods 7, 7. The rotation supporting members 6, 6 are mounted in position by fitting the mounting rods 7, 7 in mounting openings 10, 10 formed in the rear portion of the lower lid 3 and by threading a screw 25 into the distal ends of the mounting rods 7, 7. These rotation supporting members 6, 6 are provided with supporting shaft portions 8, 8. These supporting shaft portions 8, 8 extend along the rear side edge of the lower lid 3 to be co-axial with respect to each other. The supporting shaft portions 8, 8 are rotatably fitted in supporting holes 9, 9 formed on the rear end of the main body portion 1.

Thus, with the present disc layer, the upper lid 2 may be rotated with respect to the main body portion 1 as indicated by arrow B in FIG. 12 for exposing the first disc driving unit 22 arranged on the upper surface of the main body portion 1.

When the upper lid 2 is rotated so that the first disc driving unit 22 is exposed, the recording disc 101 may be loaded or unloaded with respect to the disc table 20.

Figure 13:
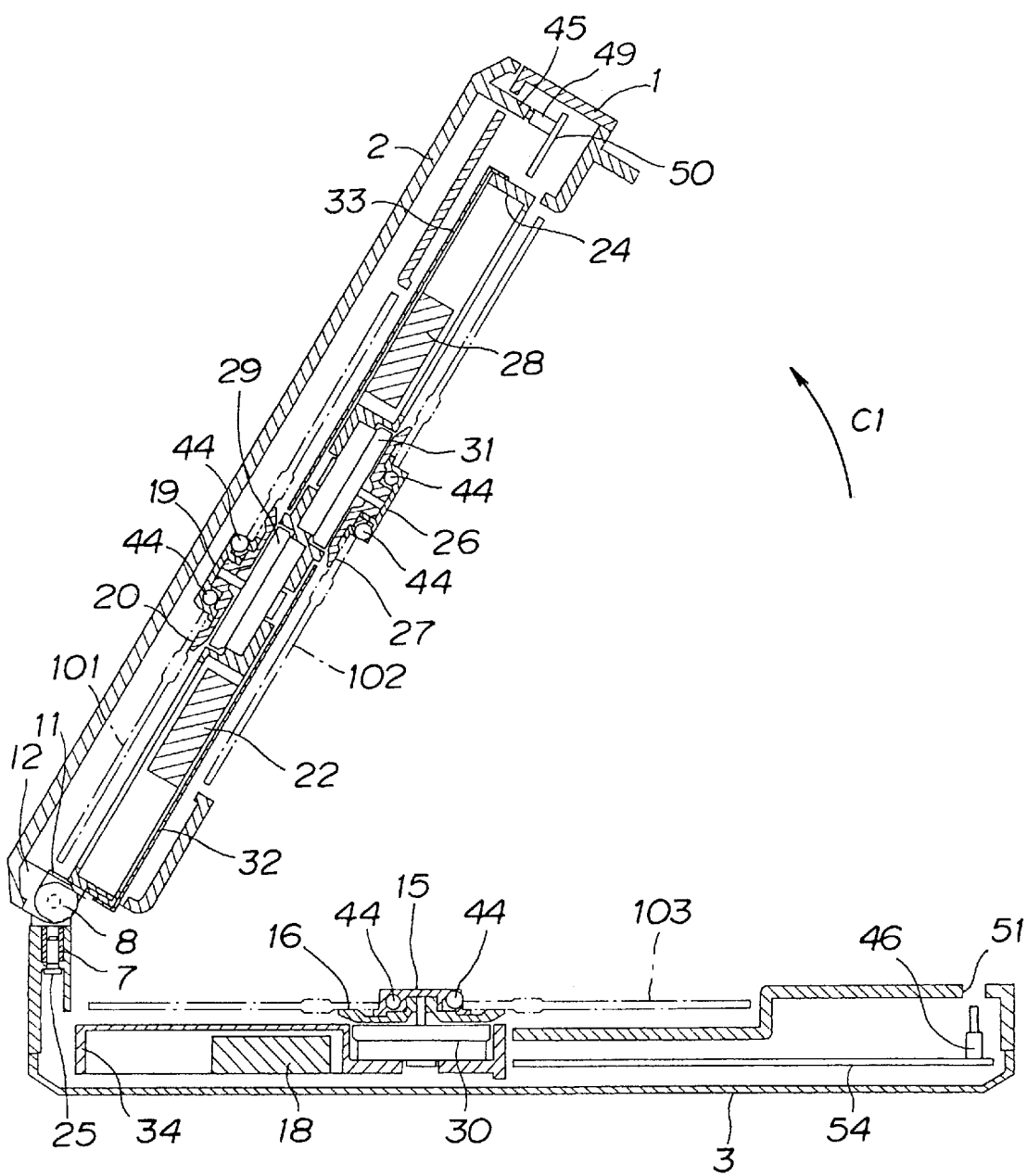
FIG. 13 is a longitudinal cross-sectional view showing the structure of the disc player shown in FIG. 9, with a lower lid being opened.
Figure 14:
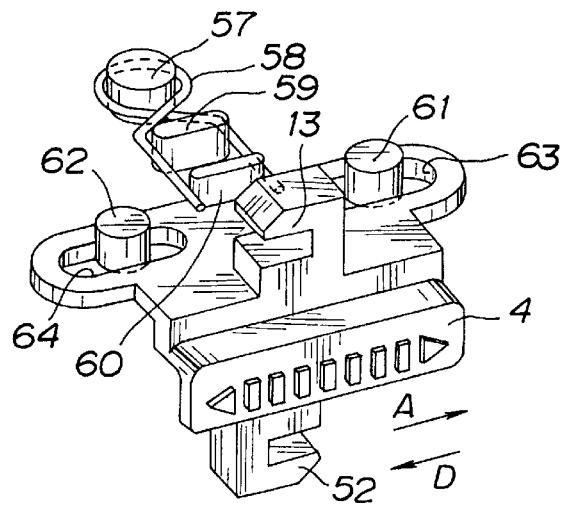
FIG. 14 is a perspective view showing the structure of a lock mechanism for locking the lid in a disc player.

With the second embodiment of the disc player, the main body portion 1 may be rotated with respect to the lower lid 3 as indicated by arrow C1 in FIG. 13 for exposing the second disc driving unit 28 and for exposing the third disc driving unit 18 mounted on the upper surface of the lower lid 3 simultaneously.

When the main body portion 1 is rotated as shown in FIG. 13 to expose the second and third disc driving units 28, 18, the optical disc 102 may be loaded or unloaded on or from the disc tables 27, 16, respectively.

In the present second embodiment, the lid-opening knob 4 is slidably mounted, as in the previous embodiment. If the lid-opening knob 4 is slid towards one side in a direction shown by arrow A in FIG. 9, the upper engagement pawl 52 is disengaged by the lid-opening knob from the mating engagement portion 53 of the lower lid 3. The mechanism of the knob 4 is similar to that of the previous embodiment.

In the present second embodiment, the upper lid opening detection switch 49 is mounted on the upper surface of the printed board 50 within the main body portion 1. A lid-opening detection output, issued on releasing the thrusting pressure on the upper lid opening detection switch 49, is supplied to a controller (not shown) as in the previous embodiment. A lower lid opening detection switch 46 is mounted on the upper surface of a printed board 56 arranged within the lower lid 3. The lower lid opening detection switch 46 is thrust by a thrusting rod 45 protuberantly formed on the lower surface of the main body portion 1 only when the main body portion 1 is rotated with resect to the lower lid 3, that is, when the lower lid 3 is closed with respect to the main body portion 1. A lid opening detection output, issued when the thrusting pressure on the lower lid opening detection switch 46 is released, is supplied to the aforementioned controller which then terminates the operation of the disc driving units 22, 28, 18 associated with the opened lid 2 or 3, herein the reproducing operation, based on the lid opening detection output. That is, the disc driving units 22, 28, 18 cannot continue the recording and/or reproducing operation with its associated lid 2 or 3 remaining open. If, in the present second embodiment, the switch 46 has detected that the lower lid 3 has been rotated open, the controller terminates the reproducing operation of the second and third disc driving units 28, 18.

With the above-described structure of the disc player of the second embodiment, by loading the optical discs 101, 102 and 103 on the disc tables 20, 27 and 16 of the disc driving units 22, 28 and 18, respectively, and by closing the lids 2, 3, the information signals can be continuously reproduced from the optical discs 101, 102 and 103 by the optical pickup units 21, 35 and 17 of the respective disc drives 22, 28 and 18, respectively. To this end, it is only sufficient if the controller controls the operation of the respective driving units based on the address information of the reproduced optical discs, as in the previous first embodiment.

With the disc player of the second embodiment, while the optical discs are reproduced by the first disc drive unit 22 and one of the second and third disc driving units 28, 18, the lid 2 or 3 may be opened for the remaining one of the optical disc drives 22, 28 and 18 for loading or unloading the optical disc.

Figure 19:
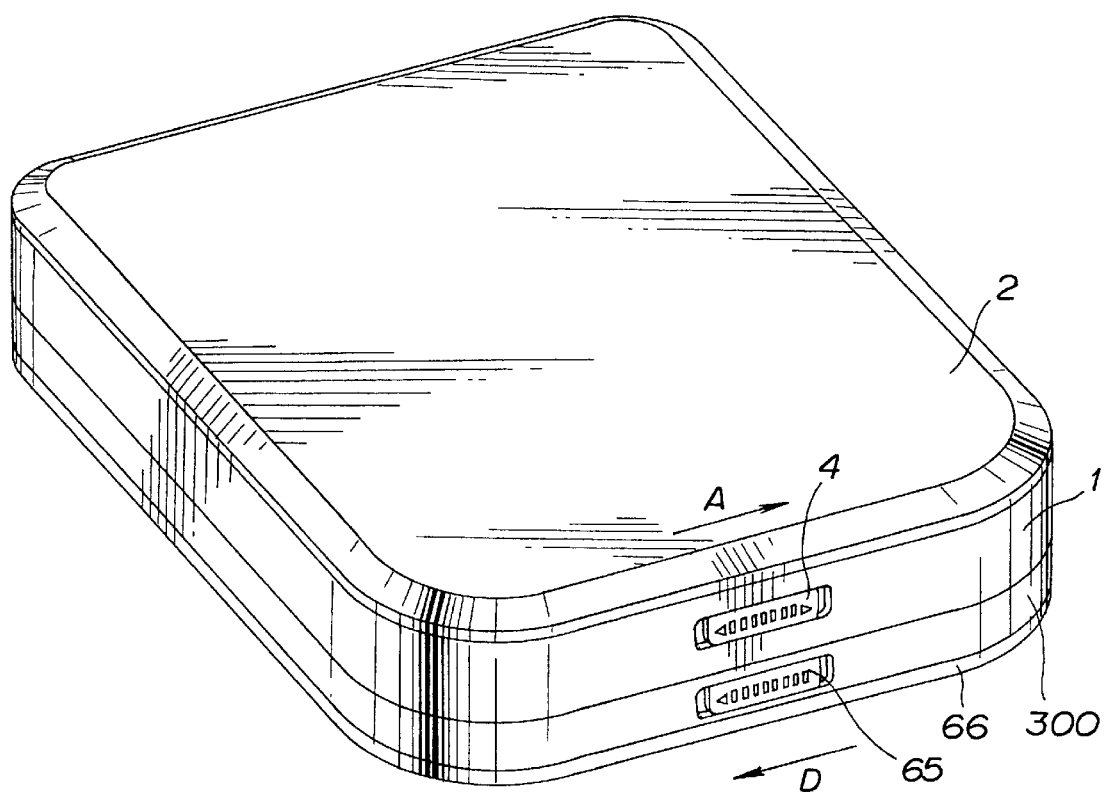
FIG. 19 is a perspective view showing an overall disc player according to a third embodiment of the present invention.
Figure 20:
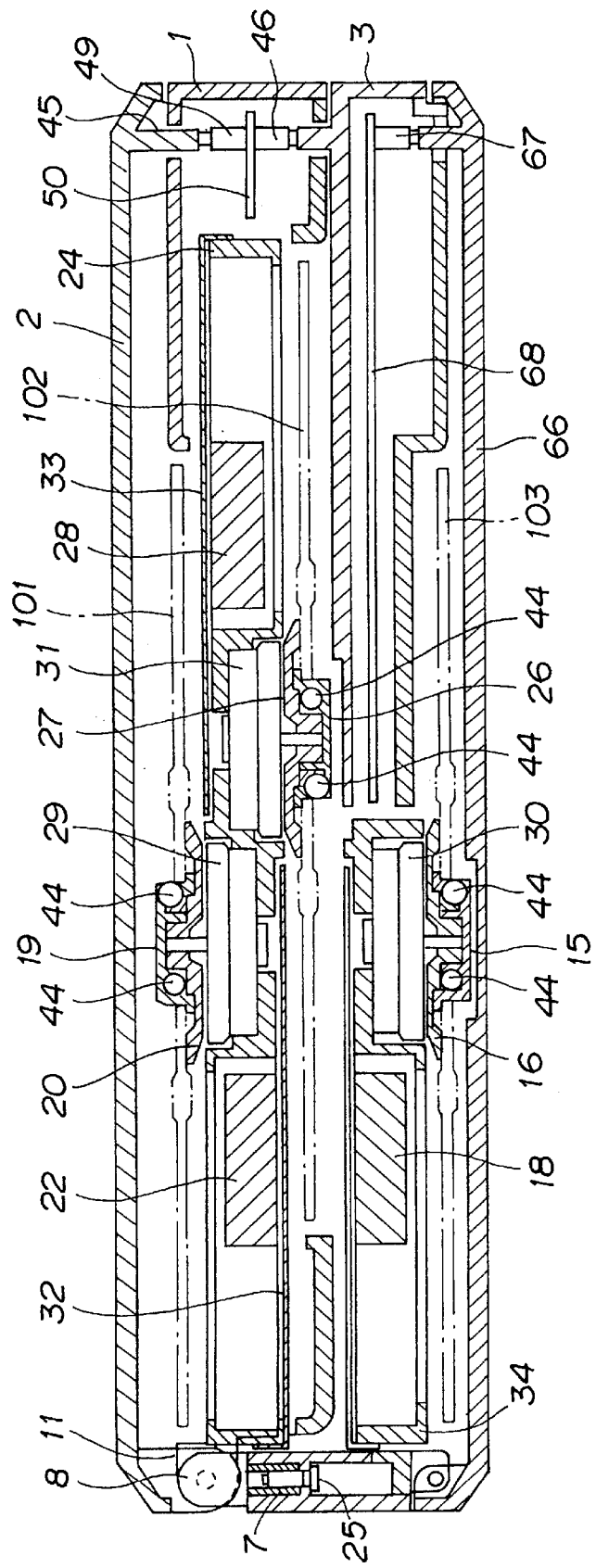
FIG. 20 is a longitudinal cross-sectional view showing the structure of the disc player shown in FIG. 19.

With the present disc player, a subsidiary casing 300 is rotatably mounted with respect to the main body portion 1, in place of the lower lid 3, and a lower lid 66 is mounted for opening and closing the lower surface of the subsidiary casing 300, as shown in FIGS. 19 and 20. A disc player shown in FIGS. 19 and 20 is now explained as a third embodiment. Parts or components similar to those of the first and second embodiments are denoted by the same reference numerals and their corresponding description is omitted for clarity.

The subsidiary casing 300 is rotatably mounted on the lower surface of the main body portion 1, as in the previous second embodiment, and may be moved towards and away from the main body portion 1 for opening and closing the lower surface of the main body portion 1.

For rotating the subsidiary casing 300 in a direction of opening the upper part of the second disc driving unit 28 with respect to the main body portion 1, it suffices to slide the lid-opening knob 4 provided on the front side of the main body portion 1 in a direction indicated by arrow D0 in FIG. 19. If the knob 4 is slid in a direction of an arrow A0 in FIG. 19, it becomes possible to rotate the upper lid 2 in the opening direction, as in the previous embodiment.

The third disc driving unit 18 is mounted on the lower surface of the subsidiary casing 300. The disc table 16 of the third disc driving unit 18 is positioned on the lower surface of the subsidiary casing 300. In distinction from the second embodiment, the third disc driving unit 18 is arranged on the subsidiary casing 300 so that the surface scanned by the optical pickup unit 35 of the optical disc 102 loaded on the second disc driving unit 28 is oriented in the same direction as the surface scanned by the optical pickup unit 17 of the optical disc 103 loaded on the third disc driving unit 18. This causes the second disc driving unit 28 to be moved by parallel displacement downwards in FIG. 20 in parallel with the disc surface so that the center of rotation of the spindle motor 30 of the disc driving unit 18 is disposed on the centerline of rotation of the spindle motor 29 of the first disc driving unit 22, as shown in FIG. 20. When the discs 101, 102 and 103 are loaded on the disc driving units 22, 28 and 18 as shown in FIG. 20, the optical discs 101, 102 and 103 run substantially parallel to one another.

The lower lid 66 is rotatably mounted on the subsidiary casing 300 via a hinge for opening and closing the lower surface of the subsidiary casing 300. The lower lid 66 is opened by sliding a lid-opening knob 65 provided on the front surface of the subsidiary casing 300 in a direction indicated by arrow D0 in FIG. 19. The lid-opening knob 65 is similar to the lid-opening knob 4 except that only the lower engagement pawl is provided, while the upper engagement pawl provided along with the lower engagement pawl in the knob 4 is omitted.

The disc player of the present third embodiment is provided with lid opening detection switches 49, 46 associated respectively with the lid 2 and the subsidiary casing 300 and with a lid opening detection switch 67 for detecting the opening of the lower lid 66 with respect to the subsidiary casing 300. The lid opening detection switches 49, 46 are provided on the upper and lower surfaces of the printed board 50 in the main body portion 50, while the lid opening detection switch 67 for detecting the opening of the lower lid 66 is provided on the upper surface of the printed board 68 within the subsidiary casing 300.

With the present third embodiment of the disc player, the lid opening detection outputs from the lid opening detection switches 49, 46 and 67 are supplied to a controller, not shown, as in the above-described embodiment. The controller is responsive to the lid opening detection output to terminate the operation of the opened upper lid 2, subsidiary casing 300 or the first to third disc driving unit 22, 28 or 18 associated with the lower lid 66.

The disc driving unit 22, 28 or 18 cannot continue the reproducing operation while the lids 2 or 3 or the subsidiary casing 300 is kept open.

With the above-described structure of the third embodiment of the disc player, the optical discs 101, 102 and 103 are loaded respectively on the disc tables 20, 27 and 16 of the disc driving units 22, 28 and 18 and the lids 2, 3 are closed, whereby the information signal can be continuously reproduced from the recording discs 101, 102 and 103 by the optical pickup units 21, 35 and 17 of the disc driving units 22, 28 and 18. The coordinating operations for the disc driving units may be performed by the controller based on the address information of the optical discs as in the previous embodiment.

With the present third embodiment, while the optical disc loaded on one of the disc driving units 22, 28 and 18 is being reproduced, the lid 2 or 66 for the remaining disc driving units or the subsidiary casing 300 may be opened for loading or unloading the associated optical discs.

In the above-described embodiments, a separate spindle motor is provided for each of the first and second disc driving units, as may be seen with the first embodiment. However, the sole spindle motor may be commonly used by both the first and second disc driving units. By way of a fourth embodiment, a disc player in which one spindle motor is commonly used is explained by referring to FIGS. 21 through 23, in which only the essential portions of the fourth embodiment are explained. Parts or components similar to those of the first embodiment are denoted by the same reference numerals and the corresponding description is omitted for clarity.

Figure 21:
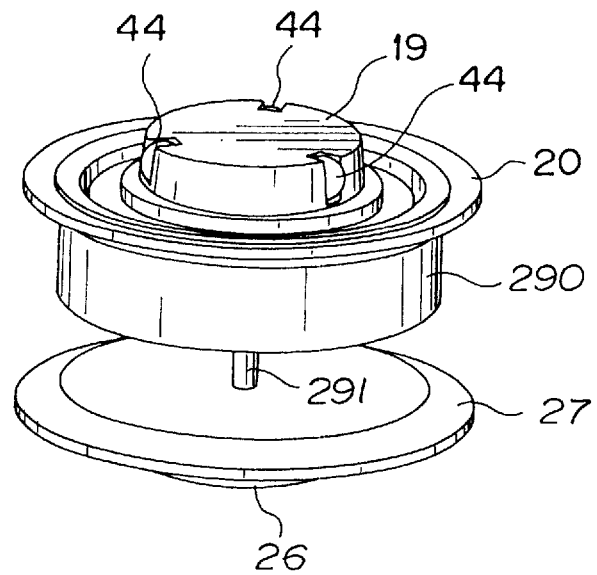
FIG. 21 is a perspective view showing the structure of a spindle motor of a disc player according to a fourth embodiment of the present invention, with a spindle shaft of a first disc driving unit being in alignment with a spindle shaft of a second disc driving unit in the disc player.
Figure 22:
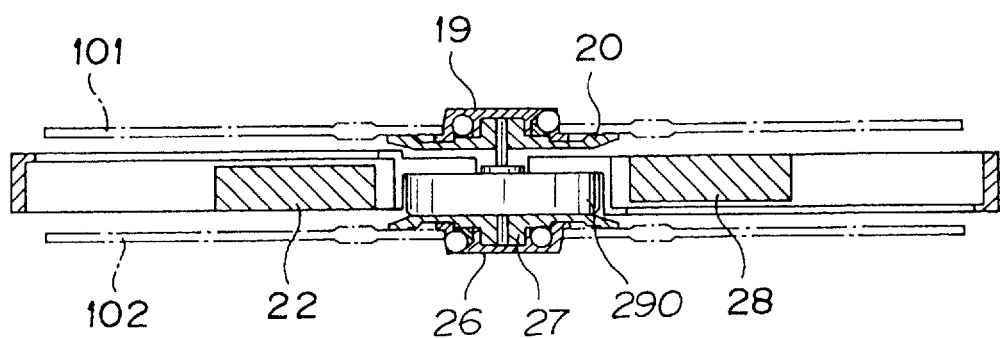
FIG. 22 is a longitudinal cross-sectional view showing the structure of first and second disc driving units in the disc player shown in FIG. 21, with the spindle shafts being aligned axially with each other.

In the disc player of the fourth embodiment, a spindle motor 290 has a single rotary shaft 291 extending vertically from a main motor portion, as indicated in FIGS. 21 and 22. The one end of the rotary shaft 291, or the upper end thereof in FIG. 22, carries the disc table 20 of the first disc driving unit 22, while the opposite end of the rotary shaft, or the lower end thereof in FIG. 22, carries the disc table 27 of the second disc driving unit 28. In the present embodiment, the spindle motor 290 is mounted on one of the frames 22 and 28. However, the spindle motor 290 may also be clamped between the frames 22 and 28. The direction of rotation of the spindle motor 290 is switched depending on whether the optical disc is reproduced by the first disc driving unit 22 or by the second disc driving unit 28. The direction of the spindle motor 290 when reproducing the optical disc by the second disc driving unit 28 is reversed from the direction of the spindle motor when reproducing the optical disc by the first disc driving unit 28. The direction of rotation of the spindle motor 290 is switched responsive to a control signal from a controller (not shown). The optical pickup unit 21 of the first disc driving unit 22 and the optical disc driving unit 35 of the second disc driving unit 28 are arrayed on both sides of the spindle motor 290 for movement on the same straight line, as shown in FIG. 23.

Figure 23:
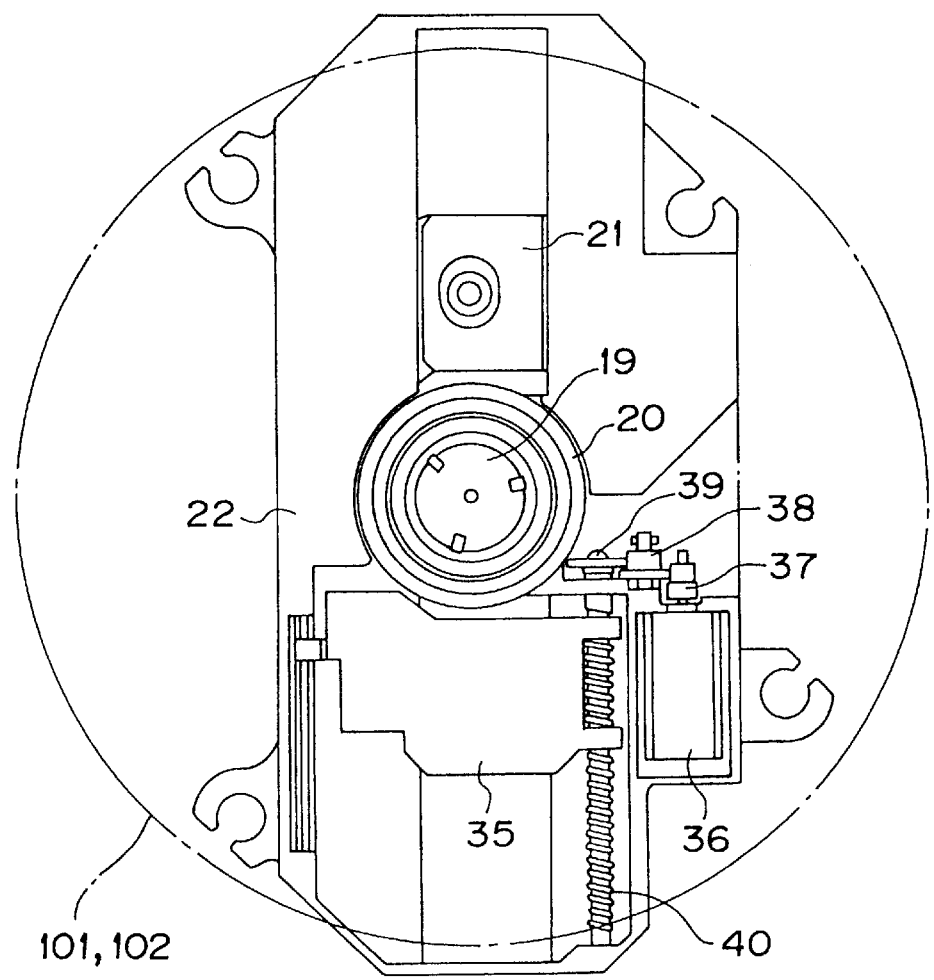
FIG. 23 is a plan view showing the structure of the first and second disc driving units being in alignment.

In the fourth embodiment of the disc player, since the number of the spindle motors is reduced compared to that of the above-described embodiments, not only can the entire disc player be reduced in thickness, but the player device can be reduced in planar size compared to the disc players of the first to third embodiments, as shown in FIG. 23. The reason is that, with the present fourth embodiment, the optical disc 101 overlaps with the optical disc 102 in the disc player, as shown in FIG. 23.

In the disc player according to the present invention, by loading the recording discs in the associated disc driving units, the information signals can be continuously recorded and/or reproduced on or from the recording discs without transporting the optical discs within the apparatus.

That is, the disc player according to the present invention can perform continuous recording and/or reproduction of information signals on or from plural recording discs despite the fact that it has a simplified structure, small in size and light weight.

Although the foregoing description has been made with reference to a disc player, as a disc recording and/or reproducing apparatus, for reproducing an optical disc, as a disc-shaped recording medium, the disc-shaped recording medium may also be a magnetic disk, while a recording and/or reproducing apparatus may also be substituted for the disc player.

The present invention is not limited to the above-described merely illustrative embodiments and may comprise many modifications within the scope of the invention.

What is claimed is:

1. A disc recording and/or reproducing apparatus comprising:

first recording and/or reproducing means for recording and/or reproducing a first disc having a scanning surface, said first recording and/or reproducing means including first rotational driving means for rotationally driving the first disc and first head means for recording and/or reproducing data on the first disc;

second recording and/or reproducing means for recording and/or reproducing a second disc having a scanning surface, said second recording and/or reproducing means including second rotational driving means for rotationally driving the second disc and second head means for recording and/or reproducing data on the second disc; and supporting means for supporting said first recording and/or reproducing means and said second recording and/or reproducing means in a layered state, said supporting means carrying said first recording and/or reproducing means on a first surface side thereof and also carrying said second recording and/or reproducing means on, a second surface side thereof which faces away from said first surface side, wherein said first recording and/or reproducing means and said second recording and/or reproducing means are arranged on said supporting means such that the first and second discs, which are rotationally driven by said first rotational driving means and said second rotational driving means, respectively, each rotate in a plane substantially parallel to each other, and wherein said first rotational driving means and said second rotational driving means are arranged on said first recording and/or reproducing means and said second recording and/or reproducing means, respectively, so that one of said first rotational driving means and said second rotational driving means is offset relative to the other of said first rotational driving means and said second rotational driving means such that the first and second rotational driving means have different rotational axes.

2. A disc recording and/or reproducing apparatus according to claim 1, wherein said first recording and/or reproducing means and said second recording and/or reproducing means are arranged on said supporting means so that the scanning surfaces of the first and second discs, which are respectively scanned by said first and second head means, face each other.

3. A disc recording and/or reproducing apparatus according to claim 1, said apparatus further comprises opening/closing means for opening/closing the first and second recording and/or reproducing means and detection means for detecting that said opening/closing means is in said position of closing said first and second recording and/or reproducing means, wherein the operation of said first and second recording and/or reproducing means is controlled based on an output signal of said detection means.

4. A disc recording and/or reproducing apparatus according to claim 3, wherein said opening/closing means comprises a first opening/closing unit for opening/closing said first recording and/or reproducing means and a second opening/closing unit for opening/closing said second recording and/or reproducing means, wherein said detection means is actuated by the opening/closing operation of said first or second opening/closing means.

5. A disc recording and/or reproducing apparatus according to claim 4, wherein said apparatus further comprises a lock member for locking said first and second opening/closing units at a position of closing said first and second recording and/or reproducing means, wherein one of said first and second opening/closing units is unlocked depending on the direction of movement of said lock member.

6. A disc recording and/or reproducing apparatus according to claim 1, wherein said apparatus further comprises:

a third recording and/or reproducing means for recording and/or reproducing a third disc having a scanning surface; and a second supporting means for rotatably mounting said third recording and/or reproducing means on said second supporting means.

7. A disc recording and/or reproducing apparatus according to claim 6, wherein one of said first, and second recording and/or reproducing means is arranged on said supporting means so that a respective one of said, second and third scanning surfaces of the first, and second, discs is oriented in the same direction as the scanning surface of the third disc.

8. A disc recording and/or reproducing apparatus comprising:

first recording and/or reproducing means for recording and/or reproducing a first disc, said first recording and/or reproducing means including first rotational driving means for rotationally driving the first disc and first head means for recording and/or reproducing data on the first disc;

second recording and/or reproducing means for recording and/or reproducing a second disc, said second recording and/or reproducing means including second rotational driving means for rotationally driving the second disc and second head means for recording and/or reproducing data on the second disc; and supporting means for supporting said first and second recording and/or reproducing means, said supporting means supporting said first and second recording and/or reproducing means in the recording and/or reproducing state of the first and second discs such that the first and second discs are substantially parallel to each other, wherein said second recording and/or reproducing means is layered with respect to said first recording and/or reproducing means with said supporting means placed solely in between the first and second discs, and wherein said first rotational driving means and said second rotational driving means are respectively arranged on said first recording and/or reproducing means and said second recording and/or reproducing means so that one of said first rotational driving means and said second rotational driving means is offset relative to the other of said first rotational driving means and said second rotational driving means such that the first and second rotational driving means have different rotational axes.

9. A disc recording and/or reproducing apparatus according to claim 8, wherein said first recording and/or reproducing means and said second recording and/or reproducing means are arranged on said supporting means so that scanning surfaces of the first and second discs, which are respectively scanned by said first and second head means, face each other.

10. A disc recording and/or reproducing apparatus according to claim 8, wherein said apparatus further comprises opening/closing means for opening/closing the first and second recording and/or reproducing means and detection means for detecting that said opening/closing means is in said position of closing said first and second recording and/or reproducing means, wherein the operation of said first and second recording and/or reproducing means is controlled based on an output signal of said detection means.

11. A disc recording and/or reproducing apparatus according to claim 10, wherein said opening/closing means comprises a first opening/closing unit for opening/closing said first recording and/or reproducing means and a second opening/closing unit for opening/closing said second recording and/or reproducing means, wherein said detection means is actuated by the opening/closing operation of said first or second opening/closing unit.

12. A disc recording and/or reproducing apparatus according to claim 11, wherein said apparatus further comprises a lock member for locking said first and second opening/closing means at a position of closing said first and second recording and/or reproducing means, wherein one of said first and second opening/closing units is unlocked depending on the direction of movement of said lock member.

13. A disc recording and/or reproducing apparatus according to claim 8, wherein said apparatus further comprises:

a third recording and/or reproducing means for recording and/or reproducing a third discs; and a second supporting means for rotatably mounting said third recording and/or reproducing means on said second supporting means.

14. A disc recording and/or reproducing apparatus according to claim 13, wherein one of said first and second recording and/or reproducing means is arranged on said supporting means so that a respective one of scanning surfaces of the first and second, discs are oriented in the same direction as a scanning surface of the third disc.

* * * * *